Dec. 4, 1945.    J. F. PETERS    2,390,120
CAN BODY MAKER
Filed Sept. 12, 1942    4 Sheets-Sheet 3

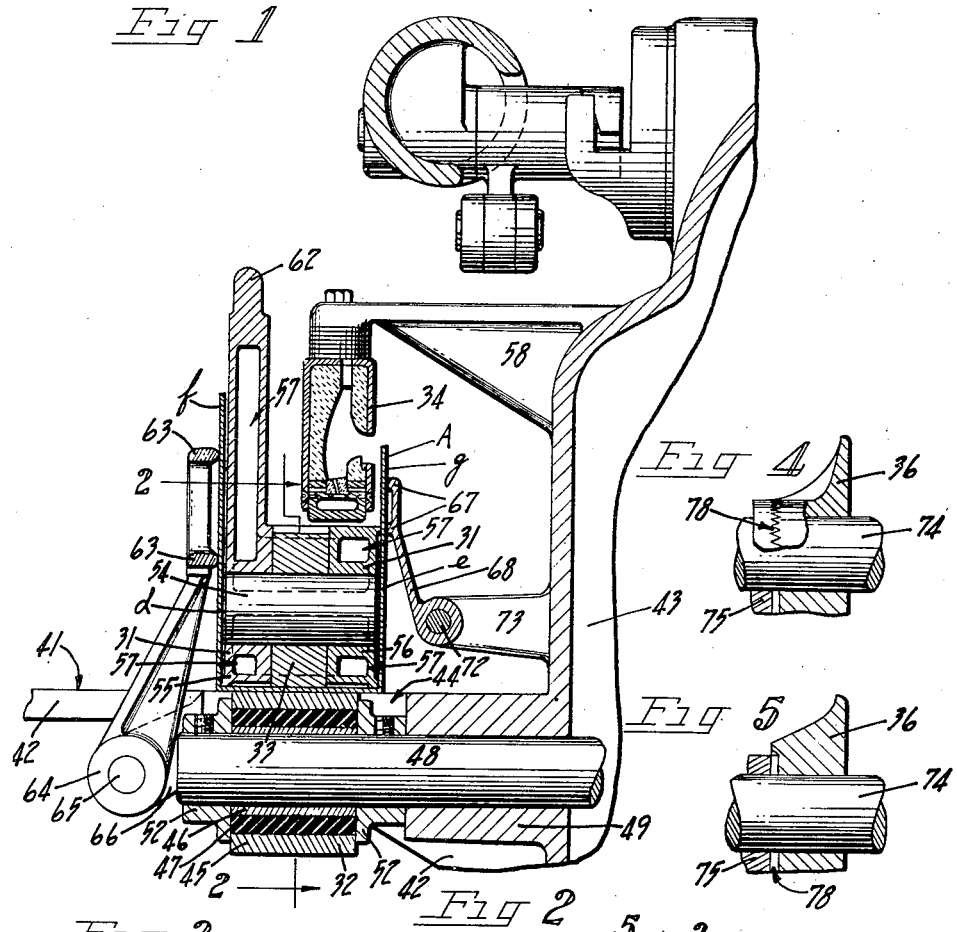

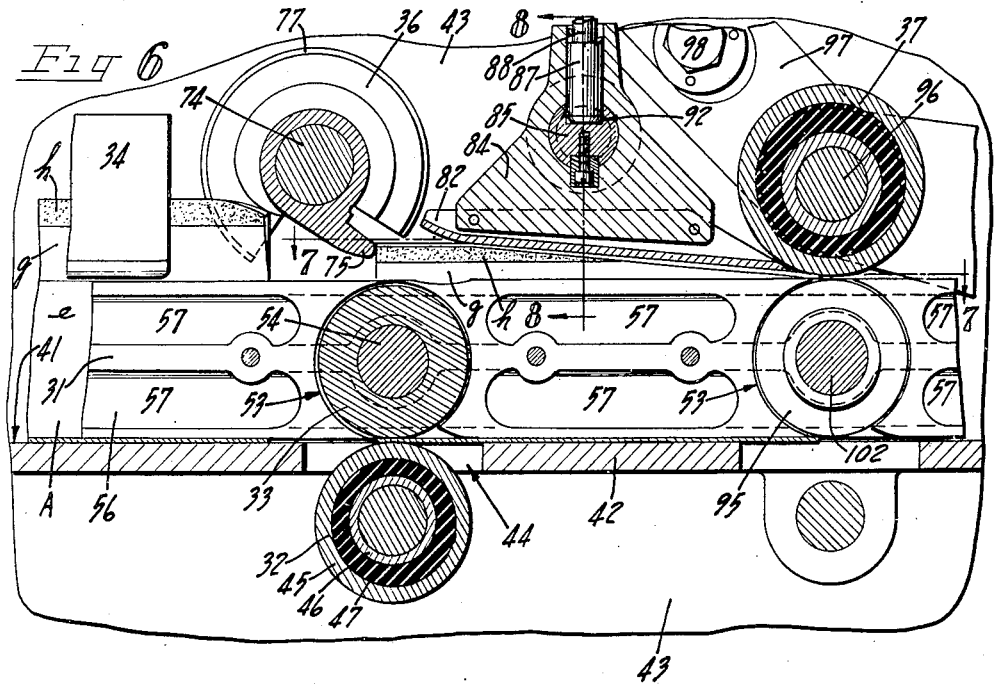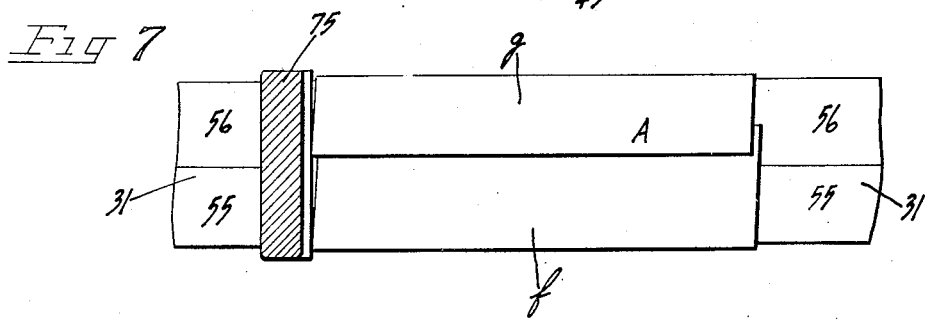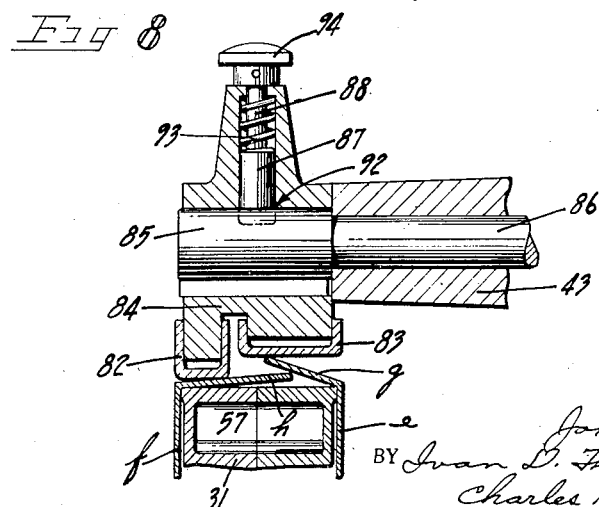

INVENTOR.
John F. Peters
BY Ivan D. Thornburgh
Charles H. Erne
ATTORNEYS

Dec. 4, 1945.  J. F. PETERS  2,390,120
CAN BODY MAKER
Filed Sept. 12, 1942  4 Sheets-Sheet 4

INVENTOR.
John F. Peters
BY Ivan D. Thornburgh
Charles H. Erne
ATTORNEYS

Patented Dec. 4, 1945

2,390,120

UNITED STATES PATENT OFFICE 2,390,120

CAN BODY MAKER

John F. Peters, Leonia, N. J., assignor to American Can Company, New York, N. Y., a corporation of New Jersey Application September 12, 1942, Serial No. 458,099

4 Claims. (Cl. 93—52)

This invention relates to can body making machines and has particular reference to certain improvements in producing tubular fibre can or container bodies from blanks which are folded progressively into can body shape by a rolling action which is effected by rollers having a continuously changing surface contour and which carry out the folding action while such body blanks are being propelled along a predetermined path of travel at high speed.

The machine disclosed in the accompanying drawings and described herein is similar to the machine shown in my copending application filed in the United States Patent Office July 8, 1942, and identified by Serial Number 450,203, and which is adapted also for use in the manufacture of fibre milk containers of the character revealed in United States Patent No. 2,085,979, issued July 6, 1937, to J. M. Hothersall, on Container. This present application is a continuation in part of my copending application noted above.

In the manufacture of fibre can bodies, it is customary to bond the body walls in the side seams together with an adhesive which in the present instance is of the thermoplastic variety. The adhesive preferably is carried on extended edge portions of the blank and is heated to a tacky condition while the blank is being propelled continuously along a predetermined path of travel adjacent a body forming horn. The extended portions of the advancing blank then are folded against the horn into overlapping relation and are brought progressively into engagement with each other and with the tacky adhesive therebetween for bonding the lapped edge portions together in a side seam joint.

The instant invention contemplates a continuous roller feed between which partly folded body blanks having extended portions are passed successively at high speed along a body forming horn and into the path of rotating folding rollers disposed adjacent the horn, so that the extended portions with an adhesive interposed, may be folded progressively first in spaced relation and then gradually into overlapped position against the horn, thus producing a bonded lapped side seam joint in the wall of a completely formed tubular body.

An object of the invention is the provision of certain improvements in can making machines wherein previously prepared and partly folded fibre body blanks, carrying thermoplastic adhesive adjacent at least one edge of the extended portions, are advanced continuously along a body forming horn at high speed while the adhesive region is heated into a tacky condition preparatory to roller folding the extended portions in spaced angular relation, such spacing preventing premature bonding of such portions together until they are in a predetermined overlapped position, whereupon the lapped edge portions are brought into engagement with each other and against the body forming horn by a rolling action for bonding them together in a hermetic side seam joint.

Another object of the present improvement is the provision in such a machine of a pair of rotary folding rollers operable adjacent a body forming horn and which have continuously changing tapered or partial helical cam shaped peripheries which are adapted for engaging the extended portions of a moving body blank and for folding the portions inwardly against the horn in angularly spaced overlapped relation, in which position they are advanced further and are guided by stationary elements so that an adhesive interposed between the edges of the lapped portion is prevented from prematurely bonding them together until the ends of such bodies are squared and the longitudinal lapped edge portions are brought into transverse alignment incident to sealing them into a side seam joint.

Numerous other objects and advantages of the invention will be apparent as it is better understood from the following description, which, taken in connection with the accompanying drawings, discloses a preferred embodiment thereof.

Referring to the drawings:

Figure 1 is a transverse view in section of a can body making machine embodying the present invention, with parts broken away;

Fig. 2 is a fragmentary vertical sectional view taken substantially along the broken line 2—2 in Fig. 1, with parts broken away;

Fig. 3 is a sectional view taken substantially along the broken line 3—3 in Fig. 2;

Figure 9:
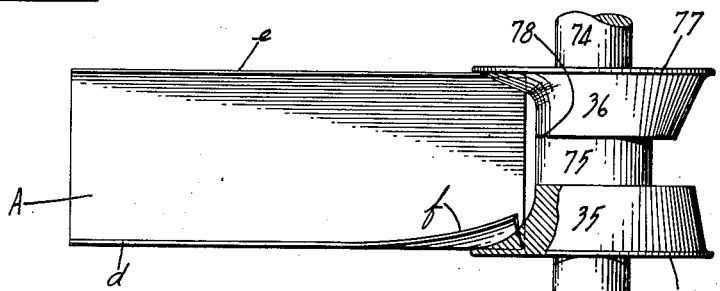
Figure 10:
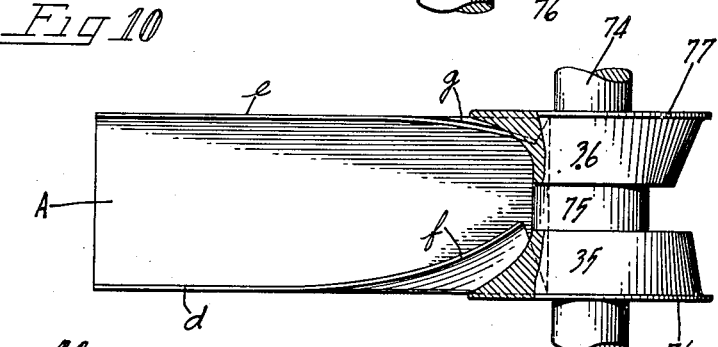
Figure 11:
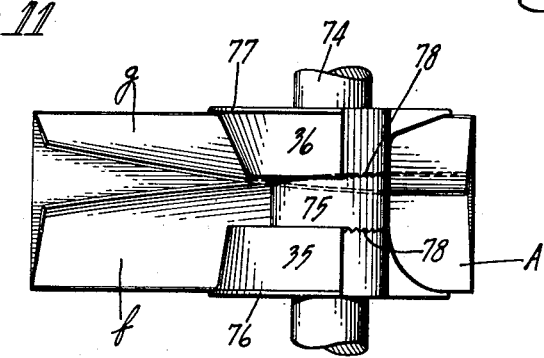
Figure 12:
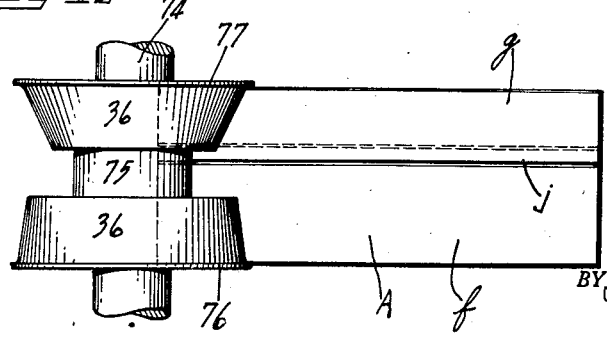
Figure 13:
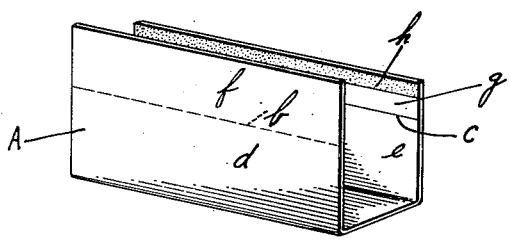
Figure 14:
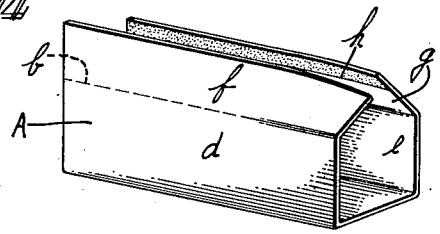
Figure 15:
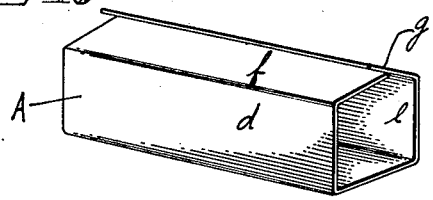

Figs. 4 and 5 are fragmentary sectional details as viewed substantially along the lines 4—4 and 5—5 in Fig. 2;

Fig. 6 is a sectional view similar to Fig. 2 with certain parts shown in a different position and other parts added, the view being taken substantially along the same broken line 2—2 in Fig. 1;

Fig. 7 is a fragmentary detail as viewed substantially along the broken line 7—7 in Fig. 6, with part in section;

Fig. 8 is a fragmentary sectional detail as viewed substantially along the line 8—8 in Fig. 6, with parts broken away;

Figs. 9 and 10 are plan views of partly folded body blanks, showing the extended portions being bent inwardly by engagement against the changing peripheral contour of the rotary folding rollers, the views also showing parts broken away and parts in section;

Figs 11 and 12 are views similar to Figs. 9 and 10 illustrating the extended portions during various stages of being folded into overlapping relation; and Figs. 13, 14, 15 and 16 are perspective views showing the extended portions of partly folded can body blanks from which tubular can bodies are formed and illustrating progressive stages in the folding of such extended portions to complete the formation of the body.

The machine embodying the instant invention is arranged to receive individual, U-shaped previously prepared and partly folded fibre body blanks A (Fig. 13) in rapid succession, each blank having longitudinal creases or score lines $b$, $c$, in vertical or upstanding parts $d$, $e$. These crease lines define a line of bend thus setting off upper or extended portions $f$, $g$, from the opposite side wall parts. The extended portions are adapted upon being folded and joined together by an adhesive $h$ to provide side wall of the can body.

The body blanks A may be fed into the machine by feed rollers, which for the purpose of this invention need not be shown. Each blank is propelled along beneath a body forming horn 31 and over a series of spaced yieldable feeding rollers 32 (Fig. 1), while the opposite upstanding parts $d$, $e$ are in a vertical position against the sides of the forming horn. The feed rollers 32 are disposed and operated in cooperation with individual idler rollers 33. The idler rollers are carried in the forming horn so that body blanks may be moved freely along their path of travel.

A heating device 34 (Fig. 1) is disposed above the body forming horn 31 and extended therealong adjacent the path of travel of the body blank. This type of heating device is described fully in the United States Patent No. 2,196,982, issued April 16, 1940, to Herbert F. Cox, on a Can body making machine.

As the partly folded body blanks A are moved along the horn 31, the extended portion $g$ which carries the thermoplastic adhesive $h$ passes a zone of radiant heat from the heating device 34. Thus the adhesive is heated to a desired degree of tackiness. While the adhesive is in this sticky condition, the extended portions $f$, $g$ of the upstanding parts $d$, $e$ are folded down into overlapping spaced relation into the position best illustrated in Fig. 15, by rotary cam shaped rollers 35, 36 (Figs. 3, 9, 10, 11 and 12), preparatory to bonding the lapped edge portions together.

The vertical upstanding parts $d$, $e$ preferably are folded along the creases $b$, $c$, in angular relation with the lapped edge portions forming one side wall of the body. The lapped portions thereafter are aligned by squaring the ends to bring the longitudinal lapped edge portions into transverse alignment (Fig. 7), while still held in spaced relation (Fig. 8), with the thermoplastic adhesive still in tacky condition.

Figure 16:
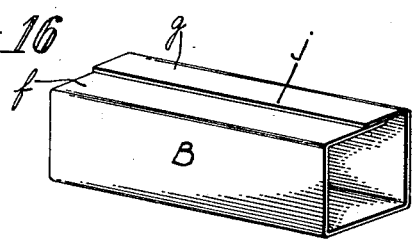

The sealing of the lapped edge portions which follows is done by a pressure feeding and sealing roller 37 (Fig. 6) which is mounted above the horn 31. The roller 37 permanently presses the lapped edge portions together into a fully hermetic side seam joint $j$ (Fig. 16). This completes the tubular fibre can body which then is discharged from the instant machine (at the right as viewed in Fig. 6) for subsequent can making operations.

Referring now to the machine in detail, reference first should be had to Figs. 1, 2 and 6 which illustrate the machine in general. The fibre blanks A after entering the machine are propelled therethrough and are supported on a table 41 which extends substantially the full length of the machine. The table forms a horizontal part of brackets 42 which are carried on a machine main frame 43.

The partly formed blanks A are placed with an intermediate side wall part resting on the table 41, beneath the body forming horn 31. An adjoining side wall part, with an extended portion on each side, thereupon projects up vertically on opposite sides of the horn (Fig. 1). The partly formed body blanks are fed in this position individually and continuously between spaced sets of feeding rollers 32 and idler rollers 33. The drawings show only one set of these rollers but it will be understood that the spaced sets are preferably arranged all along the horn 31 which may be quite extensive.

Each feeding roller 32 operates in an opening 44 formed in the table 41 (Figs. 1 and 6) and this roller preferably is of a yieldable construction. Such a roller comprises an outer metallic ring 45 and an inner metallic ring or hub 46 between which a resilient ring or core 47 is interposed. This resilient ring may be made of rubber or other yieldable material and may be vulcanized or otherwise secured to the metallic rings 45, 46. The hub of each roller is mounted on an individual shaft 48 journaled in a bearing 49 of the main frame. Washers 52 carried on and secured to the shaft 48 adjacent the end of the roller maintain the roller in position against lateral displacement.

The shafts 48 may be driven in any suitable manner so that all the rollers 32 are driven at the same speed and in timed relation with the cam shaped rollers 35, 36. Hence at least one feeding roller is in engagement with each of the moving body blanks for continuously advancing them along the horn 31 at high speed and without undue squeezing or distorting of the blank.

The resiliency of the rubber rings 47 permits this yielding of the rollers 32 and at the same time holds the outer ring of each roller in positive engagement with the moving blank and also holds the blank in frictional engagement against its cooperating idler roller 33, thereby providing a tangential rolling action at the lower surface of the body forming horn. For this purpose each idler roller 33 is operable in a clearance opening 53 formed in the horn and each roller is carried on a pin 54 mounted in the horn (Figs. 1 and 6).

The body forming horn 31 along which the partly folded body blanks A are propelled, is substantially rectangular in shape (Figs. 1 and 3). This horn preferably is made in two transverse sections 55, 56, each having a plurality of longitudinal channels formed therein. When these two sections are assembled the channels provide a connecting passageway 57 through the horn for the circulation of a cooling medium such as water. Thus while the machine is in operation, the temperature of the horn in the region of the heating device 34 is maintained at the desired degree.

The radiant heating device 34 described fully in the previously mentioned Cox patent, is preferably positioned above the body forming horn 31 (Fig. 1) and is carried by brackets 58 which may be formed integrally with the frame 43. This heating device radiates a restricted beam of radiant heat onto only that portion of a passing blank where it is desired. Therefore sufficient concentrated heat may be applied which is confined to the thermoplastic adhesive $h$ on the blanks and which heat is shielded from the adjacent uncovered areas. This method of applying heat thus prevents scorching or other detrimental effects upon the body blanks on the horn as they are advanced therealong.

An upright leg section 62 integral with the horn section 55 extends along the horn at one side of the heating device. This leg section, like the horn proper, also is water cooled and this maintains the temperature of the upstanding part $d$ of the body blank at the desired degree and prevents overheating.

Side guide rails 63 are disposed adjacent the outer vertical surface of the leg section 62 to maintain the part $d$ of the moving body blank A in a vertical position as the latter is advanced along the horn 31. These rails are supported by brackets 64 (Fig. 1) carried on pins 65 mounted in lugs 66 of the frame 43.

In like manner, guide rails 67 formed integral with a side guide 68 form a pass for the upstanding part $e$ of the blank A to hold such part in a vertical position against the horn and with the extended portion $g$ with its adhesive $h$, adjacent the heating device 34. The side guide 68 is carried on pins 72 mounted in brackets 73 of the frame 43.

As the body blanks are propelled continuously along the horn 31 and the strip of thermoplastic adhesive $h$ becomes tacky, the blanks approach the helical cam shaped rollers 35, 36 (Figs. 2, 3 and 6). Upon engagement with these rollers, the extended portions $f$, $g$ first are folded down into overlapping spaced relation as will be explained more in detail. The cam shaped rollers 35, 36 which perform this operation are secured to a shaft 74 journaled in the frame 43 and are rotated in timed relation with the moving body blanks. An aligning finger 75 having a central hub mounted on the shaft 74, is interposed between the rollers.

The outer peripheries of the two rollers 35, 36 have continuously changing unmatched contours. They are shaped with slightly curved cam sections facing each other (as best illustrated in Fig. 9) which merge into more steeply tapered sections (Fig. 10) which in turn then flatten out into the conical sections of Figs. 11 and 12. These peripheral cam surfaces of the rollers are designed first to engage the vertically disposed extended portions $f$, $g$ of the moving body blank with a gentle contact and then as the rollers revolve and the blank advances the extended blank part is pressed down into overlapping spaced relation (Fig. 3) as the blank wall bends along the creases $b$, $c$.

Outer flanged sections 76, 77 on the rollers 35, 36 (Fig. 3) maintain the upper edges of the body side wall parts against the horn and cooperate with the tapered sections on the cam rollers to form sharp corners on the body along the creased lines $b$, $c$. This creasing of the body corners is incident to forming an intermediate side wall of the folded container parts $f$ and $g$. The overlapped portions $f$ and $g$ are held apart and in spaced relation until they are squared at the ends. This prevents premature bonding of the laps.

Serrations or teeth 78 are provided on the inner faces of the hubs of each of the rollers 35, 36 and on the opposite sides of the hub section of the aligning finger 75 (Figs. 4 and 5). This provides for locking the cam rollers on the hub of the finger 75 in a desired position and permits convenient circumferential adjustment of the peripheral wall of one roller relative to the peripheral wall of another. After adjustment the rollers may be held in fixed position by means of a set screw or nut (not shown) on the shaft 74.

This aligning finger 75 extends outwardly adjacent a cut-away section in each of the cam rollers where the periphery is entirely removed. The advancing body blanks upon being folded by rotary action of the rollers 35, 36 just described are in the overlapping position shown in Figs. 2, 3 and 12 and are ready for the squaring up treatment which is illustrated in Figs. 6 and 7.

This squaring-up treatment is performed by the finger 75 while the folded can body blank is moving and while the overlapped spaced relation of the extended portions is retained by a pair of stationary hold-down shoes 82, 83 beneath which the blank passes (Figs. 6 and 8). These shoes will first be considered.

The hold-down shoes 82, 83 extend longitudinally of the horn and are mounted immediately thereabove. These shoes are located side by side with lower horizontal and inclined faces which are disposed at different elevations. Shoe 82 is located lower than shoe 83 and holds the inside folded wall part $f$ of the moving blank down and spaced away from the outer folded wall part $g$. Thus the tacky adhesive $h$ on the outer fold will not prematurely touch and stick to the inner fold.

Considered along a vertical central section, as in Fig. 6, both shoes are inclined down toward the horn 31 and toward the sealing roller 37 at their forward ends. The higher ends are adjacent the cam shaped rollers 35, 36 (Fig. 6). Thus the hold-down shoes do not press the outer wall part $g$ against the inner wall part $f$ but do bring these wall parts closer together as the blank approaches the sealing roller 37.

The hold-down shoes 82, 83 preferably are channel shaped with the vertical legs (Fig. 8) clamped over the sides of a pair of depending lugs formed on a shoe holder 84. The channel shoes are pinned to the holder (see also Fig. 6). Such a shoe holder is mounted on an enlarged end 85 of a rod 86, carried in the machine frame 43.

The shoe holder is made removable so that it can be withdrawn quickly together with the shoes 82, 83 as a unit, in the event that the body blanks become jammed. For this purpose a plunger 87 formed on the lower end of a stem 88, is carried in the shoe holder. This plunger is adapted to engage in a recess 92 formed in the rod section 85 when the shoe holder is in holding position. The plunger is held by a spring 93. A knob 94 is secured to the upper end of the stem 88 and provides for manual lifting of the plunger in effecting release of the shoe holder 84.

At the time the front edges of the folded body blank reach the sealing roller 37, the squaring finger 75 becomes effective and engages against the rear edges of the overlapped blank body wall parts $f$ and $g$ (Fig. 7). The finger then moving slightly faster than the blank at its zone of engagement applies a slight longitudinal pressure to the wall parts. This pressure shifts one or both wall parts and brings their front and back edges into transverse alignment, thus squaring the wall parts.

After this action the overlapped squared body blank wall parts are brought together immediately and are sealed down tightly in a body side seam as the seam passes under the sealing roller 37. The roller 37 also assists in advancing the blank while it presses the lapped edges against an idler roller 95 (Fig. 6).

The pressure feeding and sealing roller 37 is similar to the yieldable feeding rollers 32 previously described. It is rotated on a shaft 96 in timed relation with the shafts 48 and 74. The shaft 96 is journaled in a bracket 97, carried by the main frame 43. The bracket 97 is adapted to be rocked slightly relative to the horn 31 so that the sealing roller 37 can be adjusted to exert the desired pressure on the can body side seam. The bracket is locked in adjusted position on the machine frame by a bolt 98.

The idler roller 95 is similar to the idler rollers 33 and also is rotatable in a clearance opening 53 cut in the horn. This idler roller is carried on a pin 102, mounted in the horn in fixed position so that the periphery of the roller is substantially flush with the upper surface of the horn 31. Thus the idler roller 95 cooperates with the pressure feeding and sealing roller 37 in advancing and bonding together the overlapped edges of the extended wall portions f and g, in a side seam j. This completes the forming of the body blank into a tubular can body B, illustrated in Fig. 16. Such can bodies then are discharged from the horn (from the right hand end as viewed in Fig. 6) to any suitable place of deposit.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a can body forming machine, the combination of a horn for guiding a body blank having a wall portion projecting beyond the horn and adapted to be folded over the horn, feeding devices for propelling a blank along the horn, and a rotating folding roller disposed adjacent said horn in the path of the projecting wall portion of the moving blank for folding the wall part, said roller being rotated in time with the advancement of the blank along said horn and having a tapered cam shaped periphery which engages first the advancing edge of the projecting wall portion of the moving blank and thence progressively folds such wall portion by pressing it against the horn from projecting position into a position which is at an angle relative to the unfolded blank wall.

2. In a can body forming machine, the combination of a horn for guiding a body blank having extended wall portions projecting beyond the horn and adapted to be folded over the horn, feeding devices for continuously propelling the blank along the horn, a pair of rotating folding rollers disposed adjacent said horn in the path of the extended wall portions of the blank for folding the wall parts, said rollers being rotated in time with the advancement of the blank along said horn, and having tapered cam shaped peripheries which engage first the advancing edges of the extended wall portions of the moving blank and which thereafter progressively fold such extended wall portions toward the horn as the blank advances therealong by pressing the wall portions from projecting positions into angular positions relative to the adjacent unfolded blank walls.

3. In a fibre can body forming machine, the combination of a horn for guiding a body blank along a predetermined path of travel, said body blank being formed in U-shape with side seam wall portions extending beyond the horn, one of said side seam wall portions carrying adhesive, feeding rollers disposed adjacent to the path of travel of the blanks for continuously propelling them along the horn, a pair of rotating folding rollers disposed adjacent said horn and having tapered cam shaped peripheries for engaging the extending side seam wall portions of the moving blank and for folding them inwardly against the horn in overlapping relation with the adhesive interposed therebetween, a pair of stationary shoes disposed adjacent said rollers and at different elevations for temporarily retaining the overlapped side seam wall portions of the moving blank in spaced relation to prevent premature bonding together of these wall portions, and sealing devices located along said horn for progressively bringing the overlapped wall portions of the moving blank into engagement with each other and with the adhesive therebetween for bonding them together in a side seam joint.

4. In a fibre can body forming machine, the combination of a horn for guiding a body blank along a predetermined path of travel, said body blank being formed in a U-shape with side seam wall portions extending beyond the horn, one of said side seam wall portions carrying adhesive, feeding rollers disposed adjacent the path of travel of the blanks for continuously propelling them along the horn, a pair of rotating folding rollers disposed adjacent said horn and having tapered cam shaped peripheries for engaging the extending side seam wall portions of the moving blank and for folding them inwardly against the horn in overlapping relation with the adhesive interposed therebetween, a pair of stationary shoes disposed adjacent said rollers and at different elevations for temporarily retaining the overlapped side seam wall portions of the moving blank in spaced relation to prevent premature bonding together of these wall portions, a squaring finger rotating around the axis of said folding rollers in synchronism therewith for engaging the outer edges of the overlapped and separated side seam wall portions of the moving blank as they leave said folding rollers for shifting the wall portions longitudinally to bring the edges into transverse alignment, and sealing devices located along said horn for progressively bringing the overlapped wall portions of the moving blank into engagement with each other and with the adhesive therebetween for bonding them together in a side seam joint.

JOHN F. PETERS.